May 29, 1962 N. E. BERGNER 3,036,759
CENTRIFUGAL BOWL FOR SEPARATING SLUDGE-CONTAINING LIQUIDS
Filed Jan. 14, 1958
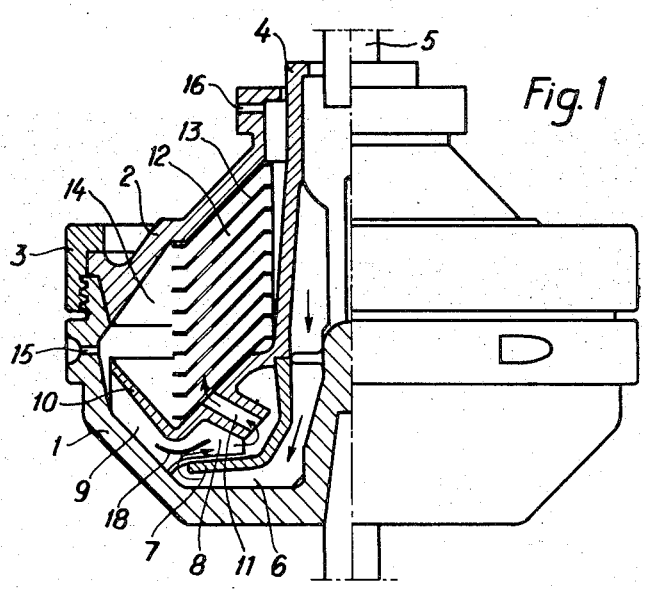
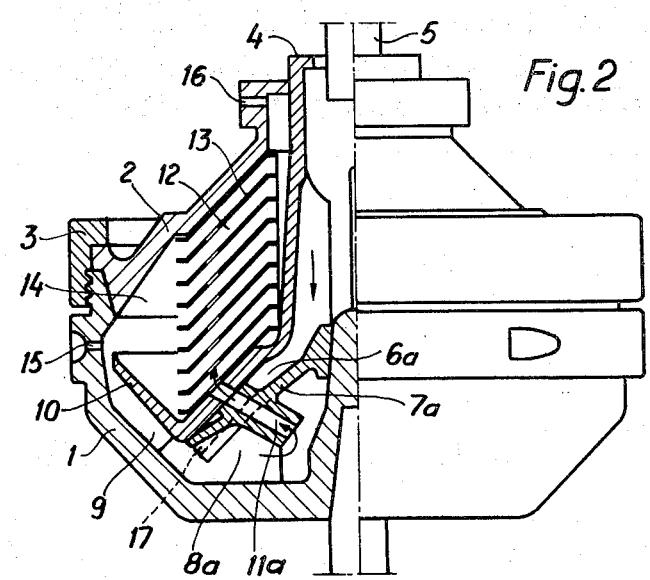
INVENTOR
Nore Einar Bergner
BY
Davis, Hoxie & Faithfull
ATTORNEYS ज
United States Patent Office 3,036,759
Patented May 29, 1962

3,036,759
CENTRIFUGAL BOWL FOR SEPARATING SLUDGE-CONTAINING LIQUIDS
Nore Einar Bergner, Stockholm, Sweden, assignor to Aktiebolaget Separator, Stockholm, Sweden, a corporation of Sweden
Filed Jan. 14, 1958, Ser. No. 708,806
Claims priority, application Sweden Jan. 22, 1957
4 Claims. (Cl. 233—29)

The present invention relates to centrifugal bowls for separating sludge-containing liquids. The invention has particular reference to a centrifugal bowl provided with a pre-separating chamber without separating discs and in which the most easily separable part of the sludge is separated off, and a further separating chamber provided with conical separating discs and coupled in series with the pre-separating chamber in such a way that the part of the separation material liberated from the most easily separable sludge is pased into the further separating chamber for further separation.

The distribution of particles and the concentration of sludge in the liquid introduced into a centrifugal separating chamber having conical discs is of extraordinary importance to the efficiency of the separator. The sludge content of the separated liquid increases almost proportionally to the sludge content of the introduced liquid. This applies as well to cases in which the liquid to be separated holds large quantities of sludge consisting of a material extremely easy to separate. As a rule, no disc set is necessary to separate the easily separable particles. In fact, such particles impair the capacity of the disc set to separate the particles which are difficult to separate and therefore constitute a hindrance to an effective utilization of a separating chamber provided with separating discs. It is evident that it should be possible to increase the separating efficiency by utilizing the disc set exclusively for removing the small particles which are difficult to separate.

The separation is sometimes carried out in two steps in such a way that in the first step the big, easily separable particles are eliminated, as by cyclones, whereas the smaller and less readily separable particles are then separated in a centrifugal separator having conical discs. Such installations are, however, complicated and expensive. Consequently, the separation is frequently restricted to a single step, and to the degree of clarification thus attained.

In some cases, the centrifuging is carried out in two steps in separators provided with two separating chambers coupled in series and arranged in one and the same bowl, thereby avoiding the drawbacks just mentioned. However, other difficulties are liable to ensue in such cases where the problem is to separate liquids with a comparatively great sludge content and to discharge the separated sludge from the separator continuously. That is, when separating easily separable sludge in the pre-separating chamber, the quantity of sludge separated out per unit of time in the subsequent separating chamber is reduced. A continuous discharge of this sludge through nozzles therefore requires special measures to be taken for maintaining the necessary sludge concentration in the nozzles, as too large quantities of the liquid component contained in the separation material will otherwise be discharged through such nozzles (the number and size of the nozzles as a rule cannot be reduced sufficiently to prevent this). Such a measure consists in returning to the nozzles more or less of the sludge which leaves through the nozzles. However, this measure entails a complication which, according to the invention, is avoided by having the two separating chambers communicate with respective sludge spaces each of which, in turn, communicates at its periphery directly with sludge discharge openings, such as nozzles or the like, common to both sludge spaces.

For a better understanding of the invention, reference may be had to the accompanying drawing in which FIGS. 1 and 2 are side elevational views, partly in section, of centrifugal bowls embodying two different forms of the invention. Each of these bowls comprises a shell having a bottom section 1 and a top section 2 held together by a threaded locking ring 3, and a distributor 4 into which the material to be separated is supplied through an inlet pipe 5.

In the bowl according to FIG. 1, the material to be separated is led from the distributor 4 through channels 6 on the underside of a plate or partition means 7, arranged beneath the distributor, into a pre-separating chamber 8 arranged above the plate 7, this pre-separating chamber being provided with radial conveyor wings extending more or less into a sludge space or sludge discharge channel 9 located outside the separating chamber 8. This sludge space 9 is limited by the bottom part 1 of the bowl and by an extension wall 10 protruding from the distributor. The pre-separating chamber 8 communicates by channels 11 with a further separating chamber 12 which is provided with spaced conical separating discs 13. The latter have distribution holes communicating with the mouths of the channels 11 where they open into the separating chamber 12. The wall 10 extends generally radially from the bowl axis and separates the chambers 8 and 12, which thus are located adjacent each other in the axial direction of the bowl. Outside the second separating chamber 12 is a sludge space 14 provided at its periphery with sludge outlets or discharge nozzles 15 which are so located that they also constitute outlets from the sludge space 9. The material to be separated is introduced into the outer, peripheral part of the separating chamber 8. As this material passes around the outer edge of the plate 7 and radially inward in the pre-separating chamber 8, a separation takes place of the easily separable, coarser sludge particles, which are thrown out into the sludge space 9. The remainder of the separation material flows inward through the pre-separating chamber 8 to the inner ends of the channels 11 and is then conveyed outwardly through these channels into the second separating chamber 12. In the interspaces between the separating discs 13, the smaller and less easily separable particles are separated out and pass on to the sludge space 14. The separated liquid is discharged through liquid outlets 16 arranged in the central part of the separating chamber 12.

The centrifugal bowl according to FIG. 2 differs from that of FIG. 1 only as to the mode of supplying the material to be separated. In the bowl according to FIG. 2, the supply channels 6a are arranged between the two separating chambers, these channels thus crossing the channels 11a connecting the two separating chambers 8a and 12 with one another. This arrangement is provided by arranging the plate or a partition means 7a on the upper side of the pre-separating chamber 8a. To prevent the inwardly-directed flow of material in the pre-separating chamber 8a from rendering difficult the separation of the coarser sludge particles and their passage to the sludge space 9, the outer edge of the plate 7a is undulated or sinuous, as indicated at 17, so that special channels are formed through which the easily separable sludge from the separating chamber 8a is led outwards to the sludge space 9, while the separation material from the channels 6a is led between these special channels into the separating chamber 8a. The separation material from the channels 6a thus passes over the outer edge of the plate 7a only along a part of its periphery. The sludge particles which are moving outward toward the sludge space 9 are thereby disturbed in the least possible degree by the separation material which flows from the channels 6a in the opposite direction into the pre-separation chamber 8a. In this case too, the pre-separating chamber is provided with conveyor wings which extend some distance into the sludge space 9.

The separator according to FIG. 1 can also be provided with a baffle arrangement 18 for dividing the flow in the space between the outer edge of the plate 7 and the underside of the distributor 4. The baffle 18, as shown, is an annular partition dividing this space into upper and lower parts, the flow through the lower part being mainly of separation material flowing inwardly into chamber 8 after rounding the overflow edge of plate 7, where the most readily separable sludge is separated and passes directly outward under baffle 18 to the sludge space 9. In the upper part, directly above baffle 18, there will be an outward movement of easily separable sludge from chamber 8, possibly in countercurrent to separation material entering chamber 8. That is, the sludge separated in chamber 8 is thrown outwardly against the lower surface of extension 10 and slides outward along this surface and through the space directly above baffle 18.

It will be apparent that the wall 10 forms a partition means located in the bowl and defining therewith the sludge spaces 9 and 14 for the respective separating chambers 8 (or 8a) and 12. The plate 7 (or 7a) constitutes a partition means in the bowl forming an overflow edge partly defining the pre-separating chamber 8 (or 8a).

I claim:

1. In a centrifugal bowl for separating a feed material comprising sludge and liquid, the bowl having a pre-separating chamber wherein the most easily separable sludge is separated from the liquid, the bowl also having a second separating chamber and conical discs in said second chamber, said chambers surrounding the bowl axis and being displaced from each other in the axial direction of the bowl, and a wall in the bowl extending generally radially from the bowl axis and disposed between said chambers, said wall partly defining at least the second chamber, the improvement which comprises a partition means in the bowl extending generally radially from said axis and forming an overflow edge at the outermost peripheral portion of the pre-separating chamber, said edge partly defining an inlet to the pre-separating chamber, the bowl having a feed channel leading outwardly along the partition means to said overflow edge, whereby the feed material entering the pre-separating chamber from said channel substantially reverses its flow direction in passing around said edge, the pre-separating chamber having an outlet which leads outwardly from an inner portion of the pre-separating chamber through said wall and which opens into the second chamber outwardly from the inner edges of the discs, the bowl having a peripheral wall provided with peripheral sludge outlets extending outwardly from the outer portion of said second chamber, the bowl also having a sludge discharge channel sloping outwardly and in said axial direction to the immediate vicinity of said sludge outlets from said outermost peripheral portion of the pre-separating chamber, said pre-separating chamber having an innermost part which is closed to the second chamber radially inward from said pre-separating chamber outlet.

2. The improvement according to claim 1, comprising also a baffle in the bowl partly defining said sludge channel.

3. The improvement according to claim 1 in which said partition means forming the overflow edge is a plate having a peripheral portion of sinuous shape defining sludge channels leading to said sludge discharge channel.

4. The improvement according to claim 1, in which said partition means also forms said outlet channel from the pre-separating chamber to the second chamber.

References Cited in the file of this patent

UNITED STATES PATENTS

| | | |
|---|---|---|
| 2,313,540 | Hall | Mar. 9, 1943 |
| 2,314,586 | Levison | Mar. 23, 1943 |
| 2,485,209 | Lundal | Oct. 18, 1949 |
| 2,645,415 | Strenzynski | July 14, 1953 |

FOREIGN PATENTS

| | | |
|---|---|---|
| 5,859 | Great Britain | Mar. 10, 1906 |
| 76,044 | Germany | July 19, 1894 |